United States Patent [19]
Sano

[11] Patent Number: 5,674,365
[45] Date of Patent: Oct. 7, 1997

[54] ELECTRODE COMPOSITION FOR ELECTROLYSIS OF WATER

[75] Inventor: Yoichi Sano, Zushi, Japan

[73] Assignee: First Ocean Co., Ltd., Tojyo, Japan

[21] Appl. No.: 594,278

[22] Filed: Jan. 30, 1996

[30] Foreign Application Priority Data

Jan. 30, 1995 [JP] Japan .................................. 7-031848

[51] Int. Cl.⁶ .................................................. C25B 11/03
[52] U.S. Cl. ................................... 204/252; 204/283
[58] Field of Search ............................... 204/280, 282, 204/283, 284, 252, 290 R; 205/630; 429/234

[56] References Cited

U.S. PATENT DOCUMENTS 3,915,834 10/1975 Wright ................................... 204/267
4,627,897 12/1986 Tetzlaff ................................. 205/334

Primary Examiner—John Niebling
Assistant Examiner—Brendan Mee
Attorney, Agent, or Firm—Sherman and Shalloway

[57] ABSTRACT

This invention relates an electrode composition for electrolysis of water, which is comprised of a panel of which one surface is made from electric conductive material and another surface is made from non electric conductive material. Plural holes are bored through said panel, and two said panels are arranged so as to hold a diaphragm between the surface of non-electric conductive material of each panel. And electrolysis reaction occurs at outer side of an anode and cathode of said electrode composition.

9 Claims, 3 Drawing Sheets

FIG. I

ELECTRODE COMPOSITION FOR ELECTROLYSIS OF WATER

BACKGROUND OF THE INVENTION

This invention relates to an electrode which is used for electrolysis of water or water which includes electrolytes, and more particularly relates to an electrode for electrolysis to produce acid and alkaline ionized water.

DESCRIPTION OF THE PRIOR ART

A method to produce acid and alkaline ionized water by electrolysis of water or water which includes electrolytes is a well-known technique. And by using this technique, a manufacturing method of healthy drinking water or germ-free water is becoming popular. Many methods and much equipment has been proposed in the prior art, such as Japanese patent publication 4-28239 and, 4-57394, Japanese Laid-open publication 6-47376, 6-55173 and 6-246268. Construction of an apparatus for producing ionized water is characterized as installing a cathode and an anode in water or water which includes electrolytes with a distance, and, separating the two electrodes with a diaphragm disposed between the two electrodes.

Usually, to perform at high electrolysis efficiency, the distance between the cathode and the anode is designed to be as short as possible. As an electrolysis reaction occurs at the surfaces of the two electrodes in water or water which includes electrolytes, acid and alkaline ion and gases are generated in two narrow spaces between the electrodes and the diaphragm. To obtain high electrolysis efficiency, the generated ions must be dispersed smoothly into water, or water which includes electrolytes, and the generated gases must be diffused quickly. Consequently, the construction of the apparatus becomes more complicated in order to satisfy these conditions. The object of this invention is to provide an apparatus for electrolysis which improves the electrolysis efficiency by shortening the distance between the two electrodes to be as small as possible and to accomplish a smooth dispersion of generated ions and a quick diffusion of generated gases, and also to simplify a construction of an apparatus for electrolysis.

SUMMARY OF THE INVENTION

Thereupon, since a conventional apparatus for electrolysis of water has a problem due to its complicated construction, the inventor has conducted intensive studies to solve this problem, and has accomplished this invention. That is, the electrode of this invention is characterised as follows: An electrode composition for electrolysis of water, comprising a panel of which one surface is made from electric conductive material and another surface is made from non-electric conductive material, plural holes are bored through said panel, two said panels are arranged so as to hold a diaphragm between surface of non-electric conductive material of each panel, and electrolysis reaction occurs at outer side of an anode and cathode of said electrode composition.

DETAILED DESCRIPTION OF THE INVENTION

Figure 1:
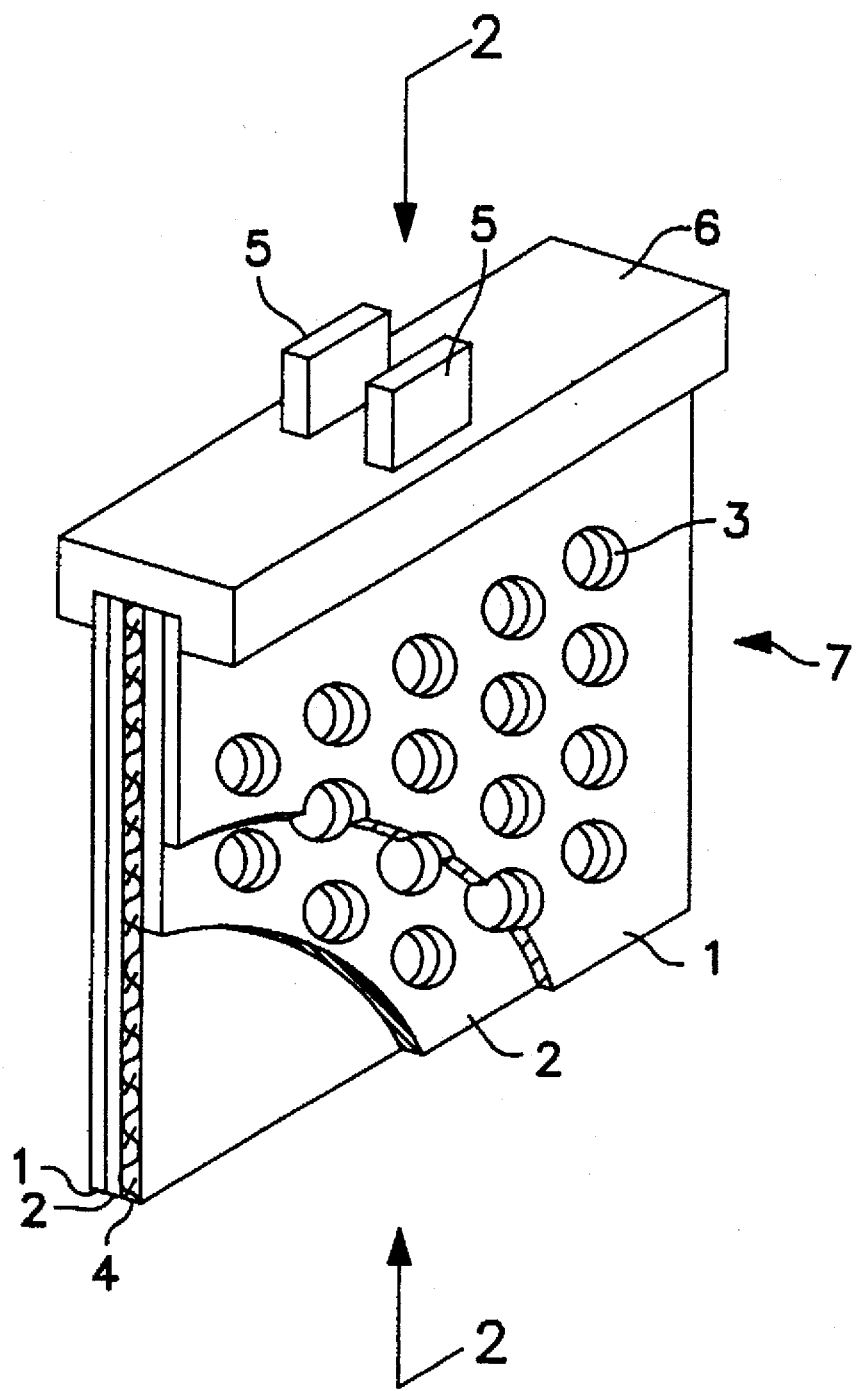
FIG. 1 is an perspective view of an example of the composite electrode construction of this invention.

When a voltage is applied across a cathode and an anode which are placed in water, electrons transfer between the surfaces of the electrodes and electrolytically dissociated water or electrolyte. In the case where NaCl is used as an electrolyte, oxygen gas and/or chlorine gas, is generated on the anode side and hydrogen ion and hydronium ion are generated simultaneously in the fluid, thus the fluid becomes acidic. On the cathode side, hydrogen gas and simultaneously hydroxide ion are generated, and so the fluid becomes alkaline. Electrons which transferred from cathode to fluid, migrate in the fluid and come to the anode. That is, an electric current flows from anode to cathode.

As reactions which generate ions and gases are taking place closely at the surfaces of cathode and anode, the concentration of ions surrounding the electrodes become higher. That is, a gradient of ionic concentration is caused. Generally, it is understood that generated substances close to the electrodes such as ions or others, are transferred or dispersed by a driving force generated by a gradient of concentration, a gradient of electric potential and by convection of fluid, and a diaphragm stretched between cathode and anode acts to prevent water on the cathode side and water on the anode side from mixing.

In the case of using a conventional face to face panel shape electrode, electrolysis actively progresses at the surfaces of the cathode and the anode which face a diaphragm located between the two electrodes, and ion and gas are generated at each electrode. The generated gas forms tiny bubbles and diffuses from the fluid existing between the electrode and the diaphragm, and cation and anion are dispersed by effects of gradient of concentration, gradient of electric potential and convection of fluid. Mixing of the two fluid can be prevented by a diaphragm, however, as there is a gradient of electric potential, ions which exist in the fluid transfer by electrophoresis through a diaphragm to the other electrode. This physical phenomenon is put to practical use, for example, in the case of the production of NaOH by electrolysis of NaCl. In this case, the generation of NaOH becomes possible by a transportation of sodium ion from the anode side to the cathode side by the electrophoresis phenomenon. The object of this invention is to produce an acid ionized water and alkaline ionized water, and to achieve this object the generated cation and the generated anion must stay on their respective sides of the diaphragm so as to make their respective concentrations higher. So the transfer of ions from one electrode to another electrode is not desirable in this invention.

An important point of this invention is that the cathode and the anode are not arranged facing each other but are arranged back to back. As the side of the electrode which faces the other electrode a non-electric conductive material is used, and a diaphragm is arranged between the electrodes, and, an electrolysis reaction taking place at the outer surface of the electrodes and generates ions and gases. At this time, as electric current flows through holes bored in each electrode and through the diaphragm to the outer surface of the opposite electrode, a gradient of electric potential only exists in the fluid between the holes and the diaphragm, and does not exist in the fluid at the outer electrode surface side. Therefore, the generated ions disperse far from each electrode by effect of gradient of concentration and by convection, and ions that exist close to the holes bored in the electrode partially transfer to the opposite electrode by the effect of the gradient of electric potential. Thus, the generated gases are easily diffused from the fluid far from diaphragm.

In the electrolysis process, electrons transfer through the fluid between cathode and anode. The distance between electrodes, a diaphragm, and in the case of back to back electrode, holes bored in the electrodes are the main causes of electric resistance. To improve efficiency of electric power usage for performing the electrolysis, it is desirable to make the distance between electrodes narrower so as to decrease the electric resistance. However, in the case of a face to face electrode construction, because it is necessary to consider the transfer of fluid between electrodes and diffusion of gases, there is a limitation on the distance. In the case of the back to back electrode construction of this invention, only the electrically non-conductive material and the diaphragm exist between the two electrodes, and so it is not necessary to consider the transfer of fluid and diffusion of gases between the two electrodes. Therefore, in this case, the distance between the two electrodes is equal to the sum total of the thickness of the two electrodes, the two electrically non-conductive layers and the diaphragm.

Turning to FIG. 1, the surface 1 of the panel is composed of an electrically conductive material such as copper, lead, nickel, chrome, titanium, gold, platinum, iron-oxyde and graphite. Preferably it is composed of platinum. It is desirable to use a thin plate of metal of 5–100 micron thickness, and more desirably a plate of titanium having 0.1–5 milli meter thickness on which surface platinum is plated. Surface 2 of the panel is composed of an electrically non-conductive resin, such as polyethylene resin, polypropylene resin, polystyrene resin, polyethyleneterephthalate resin, polyethylenechloride resin, ABS resin acrylic resin, epoxy resin, teflon resin, ceramic, natural rubber, SBR, silicone rubber, chloroprene rubber, fiber reinforced plastic plate or a thin film of an electrically non-conductive paint or synthetic resins. The surfaces 1 and 2 are tightly stuck to each other, and form a panel for use as a cathode or an anode.

Holes 3 are bored through the panel so as to be arranged on all active area for electrolysis reaction, and surface area of the one hole is from 1 to 500 mm$^2$. The ratio of surface area of the holes to that of the electrode is 10–90%, and is preferably 30–70%. Material of the diaphragm 4 is generally a non-woven cloth made from asbestos, glass wool, polyvinyl chloride fiber, polyvinylidene chloride fiber, polyester fiber or Kevlar fiber, or an unglazed ceramic plate, a sheet of paper or a film of ion-exchange resins. The diaphragm 4 is held between surfaces 2 of the anode and the cathode. Anode, cathode and diaphragm can be arranged independently, or the diaphragm can be stuck tightly to the surfaces 2 of the electrodes. Also, it is possible to put a spacer (not indicated in the drawing) made from electrically non-conductive materials, between the diaphragm and the electrodes to have a possibility of fluid existing between surface 2 and diaphragm 4.

By using the back to back construction of this invention, because the distance between anode and cathode can be shortened to the sum total of thickness of the electrodes, the insulators and the diaphragm, it is possible to improve the efficiency of electric power for electrolysis. And, since there is no generation of ions and gas between the electrode and the diaphragm, the threat of that inconsistency of electric current caused by increased electric resistance due to the gas in the fluid or in diaphragm can be ignored.

Generated ions on the back to back surface electrode of this invention disperse far from the electrodes of the effect of gradient of concentration and by convection, and the transfer power to the opposite electrode by effect of gradient of electric potential is not strong. Therefore, the transfer of generated anion and cation to the opposite electrode is less, and consequently concentration of the object ion can be raised effectively.

In the case of a conventional electrolysis method, plates of the electrodes and a diaphragm must be held independently. However, in the case of this invention, as it is possible to assemble them in simplified construction by sticking a diaphragm tightly or through the medium of spacer to an electrode, a holder to attach the electrode to an electrolysis vessel can be simplified. Therefore, the possibility for modification of electrode design is extended, and it becomes possible to manufacture not only a flat shape electrode but also a modified shape electrode such as having curved surface, spherical surface or angled shape.

While the preferred form of the present invention has been described, it is to be understood that modifications will be apparent to those skilled in the art without departing from the spirit of the invention.

The scope of the invention, therefore, is to be determined solely by the following claims.

DETAILED DESCRIPTION OF EXAMPLE

This invention is further illustrated in the following examples, however it is to be understood that the invention is not intended to be limited to these examples.

Figure 2:
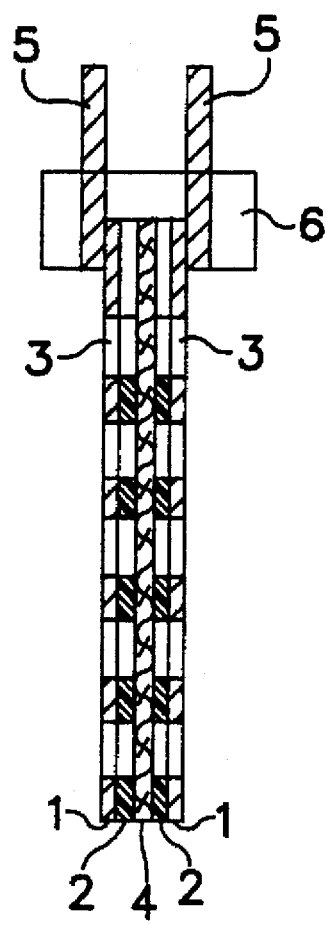
FIG. 2 is a cross section taken on line 2—2 in FIG. 1.
Figure 3:
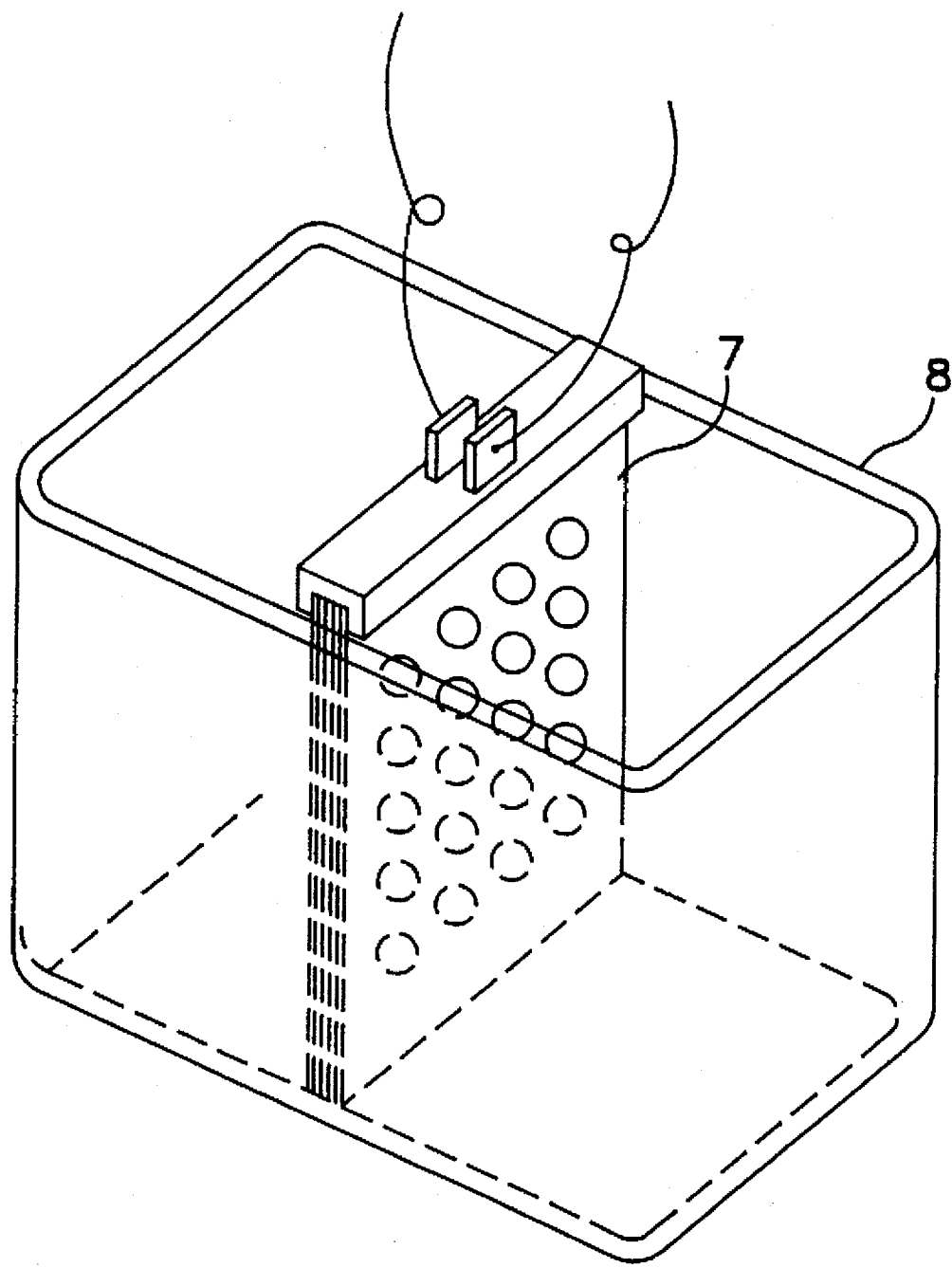
FIG. 3 is a schematic illustration of an electrolysis vessel in which the electrode is arranged.

FIG. 1 and FIG. 2 are illustrations of the composite electrode construction 7 which is characterized as simplified by sticking an electrode closely to a diaphragm and arranged in an electrically non-conductive frame 6 having contact points 5 for anode and cathode. FIG. 3 is an illustration showing the electrode construction 7 which is arranged in an electrolysis chamber 8, so as to prevent leaking of contained fluid from the contact portion of the chamber and the electrode.

EXAMPLE-1

An aqueous solution which includes 0.03 wt % of NaCl is prepared as a testing fluid to be electrolyzed. Two sheets of titanium plate of 1 mm thickness on the surface of which a thin layer of platinum is plated are prepared as the material of the panel and polyethylene film of 0.2 mm thickness is spread over one surface of said platinum plated titanium plates to forms the panels.

Holes of 5 mm diameter are bored in each panel as shown in FIGS. 1 and 2. The distance between the centers of the holes is 7.7 mm and the ratio of surface area of holes to whole area is 33%. The two panels are arranged so that the polyethylene sides face and hold a 0.17 mm thick membrane filter (Yumikron MF-60B, Yuasa Co., Ltd, Japan) as a diaphragm between them. The said membrane filter is a polyolefin coated highly porous polyester film. Thus the electrode composition of this invention is assembled.

A 100 mm×100 mm size sheet of the electrode composition is placed at the center of a one liter capacity electrolysis chamber 8. The water solution, which includes 0.03 wt % of NaCl, is poured into both separated spaces of the electrolysis chamber formed by the electrode, and mixing and leaking of the water solution can be perfectly prevented by the electrode composition.

Direct current of 13 volts constant voltage is applied, and pH and oxidation-reduction potential are measured according to the progress of time at the anode side and the cathode side by using pH meter and ORP meter. Also, the electric current is measured by ammeter. An electric power efficiency, until the pH of the anode side water becomes 2.7 is calculated. The electric power efficiency obtained by this experiment is 5.1 watt-hour/L, and other results are shown in Table. 1.

EXAMPLE-2

The diameter of the holes in the panels is changed to 7 mm and the distance between centers of the holes is set up to 10 mm. In this case, the ratio of the surface area of holes to the whole area is 44%. Using the same electrolysis equipment and the same conditions, electrolysis is carried out. The obtained results are shown in Table. 2.

In this case, the electric power efficiency to obtain pH 2.7 acid ionized water is 3.4 watt·hour/L, and it exceeds the result obtained in example-1. The effect of a larger hole surface area is obvious.

EXAMPLE-3

A 0.17 mm thick membrane filter (Yumicron-60B) is used as a diaphragm, and the same panel as in example-2 are used to assemble the electrode construction. A 360 mm×500 mm size sheet of the electrode composition is prepared and placed at the center of a 100 liter capacity electrolysis chamber. The same water solution as in example-1 is poured into the chamber, and direct current of a constant 15 amperes is applied. The obtained results are shown in Table. 3.

This experiment simulates an actual application of the invention. And as good electrical power efficiency is obtained, it seems that this invention has a good possibility of actual use.

TABLE 1

| time (min) | volt (volt) | current (mA) | anode | | cathode | |
|---|---|---|---|---|---|---|
| | | | pH | ORP (mV) | pH | ORP (mV) |
| 0 | 12.8 | 245 | 7.32 | +458 | 7.32 | +458 |
| 15 | 13.9 | 360 | 2.88 | +1025 | 11.14 | −804 |
| 30 | 14.2 | 320 | 2.54 | +1088 | 11.57 | −862 |
| 60 | 14.5 | 280 | 2.32 | +1128 | 11.79 | −884 |
| 120 | 14.7 | 170 | 2.18 | +1173 | 11.95 | −895 |

Electric power efficiency (pH 2.7) 5.1 Watt · Hour/L

TABLE 2

| time (min) | volt (volt) | current (mA) | anode | | cathode | |
|---|---|---|---|---|---|---|
| | | | pH | ORP (mV) | pH | ORP (mV) |
| 0 | 20.0 | 500 | 7.68 | +203 | 7.68 | +203 |
| 5 | 20.5 | 500 | 2.92 | +910 | 10.58 | −773 |
| 10 | 20.5 | 450 | 2.66 | +894 | | |
| 20 | 20.5 | 500 | 2.35 | +1010 | 11.44 | −867 |
| 30 | 20.6 | 500 | 2.20 | +1027 | 11.55 | |
| 40 | 21.0 | 500 | 2.08 | +1037 | 11.58 | −874 |
| 60 | 21.0 | 430 | 1.99 | +1086 | 11.64 | −881 |
| 80 | 21.0 | 450 | 1.96 | +1099 | 11.84 | |
| 100 | 21.0 | 450 | 1.94 | +1108 | 12.00 | −882 |
| 120 | 21.0 | 450 | 1.92 | +1121 | 12.01 | −880 |

Electric power efficiency (pH 2.7) 3.4 Watt · Hour/L

TABLE 3

| time (min) | volt (volt) | current (mA) | anode | | cathode | |
|---|---|---|---|---|---|---|
| | | | pH | ORP (mV) | pH | ORP (mV) |
| 0 | 29.3 | 15.0 | 7.54 | +502 | 7.54 | +502 |
| 10 | 28.5 | 15.0 | 4.33 | +906 | | |
| 20 | 26.5 | 15.0 | 2.98 | +1052 | 10.27 | −100 |
| 30 | 25.3 | 15.0 | 2.66 | +1104 | | |
| 40 | 24.8 | 15.0 | 2.57 | +1117 | | |
| 50 | 24.1 | 15.0 | 2.45 | +1130 | 11.34 | −888 |
| 60 | 23.8 | 15.0 | 2.38 | +1138 | | |

TABLE 3-continued

| time (min) | volt (volt) | current (mA) | anode | | cathode | |
|---|---|---|---|---|---|---|
| | | | pH | ORP (mV) | pH | ORP (mV) |
| 70 | 23.2 | 14.8 | 2.31 | +1144 | | |
| 90 | 22.8 | 14.7 | 2.21 | +1151 | | |
| 100 | 22.8 | 14.8 | 2.18 | +1155 | | |

Electric power efficiency (pH 2.7) 4.4 Watt · Hour/L

When water or water including electrolytes is ionized to the lower level than pH2.7, it is almost perfectly sterilized and can be used as germ-free water. And the electric power efficiency to obtain water of pH lower than 2.7 is better than that of by conventional electrolysis method which is assumable as 8–10 watt·hour/L, around. By using the electrode composition of this invention, germ-free water can be easily and economically obtained, which can be applied as mass consumption in a hospital or others.

While the preferred form of the present invention has been described, it is to be understood that modifications will be apparent to these skilled in the art without departing from the spirit of the invention.

The scope of the invention, therefore, is to be determined solely by the following claims.

What is claimed is:

1. An electrode structure comprising:
   a first panel having a first surface and a second surface, said first surface formed from an electrically conductive material and said second surface formed from an electrically non-conductive material, a plurality of holes having been formed through said first panel;
   a second panel having a first surface and a second surface, said first surface formed from an electrically conductive material and said second surface formed from an electrically non-conductive material, a plurality of holes having been formed through said second panel; and
   a diaphragm having a first side and a second side;
   said first panel disposed on said first side of said diaphragm with said second surface of said first panel facing said first side of said diaphragm;
   said second panel disposed on said second side of said diaphragm with said second surface of said second panel facing said second side of said diaphragm;
   said first panel and said second panel cooperating to hold said diaphragm therebetween.

2. The electrode structure of claim 1, wherein said first surface of said first panel and said first surface of said second panel are independently composed of a material selected from the group consisting of copper, lead, nickel, chrome, titanium, gold, platinum, iron oxide and graphite.

3. The electrode structure of claim 1, wherein said first surface of said first panel and said first surface of said second panel are composed of a platinum-plated metal.

4. The electrode structure of claim 1, wherein said second surface of said first panel and said second surface of said second panel are independently composed of a material selected from the group consisting of polyethylene resin, polypropylene resin, polystyrene resin, polyethyleneterephthalate resin, polyethylenechloride resin, ABS resin, acrylic resin, epoxy resin, teflon resin, natural rubber, SBR, silicone rubber, chloroprene rubber and ceramic.

5. The electrode structure of claim 1, wherein said second surface of said first panel and said second surface of said second panel are composed of polyethylene.

6. The electrode structure of claim 1, wherein said diaphragm is composed of a material selected from the group consisting of a non-woven cloth, an unglazed ceramic plate, a sheet of paper and a film of ion-exchange resin.

7. The electrode structure of claim 1, wherein, in said panels, the ratio of the surface area of said holes to the whole surface area of said panel is 10–90%.

8. The electrode structure of claim 7, wherein said ratio is 30–90%.

9. The electrode structure of claim 1, wherein said second surface of said first panel is in contact with said first side of said diaphragm; and said second surface of said second panel is in contact with said second side of said diaphragm.

* * * * *